US012803431B2

(12) United States Patent
Rosado et al.

(10) Patent No.: US 12,803,431 B2
(45) Date of Patent: Nov. 17, 2026

(54) BALANCER CIRCUIT FOR SERIES CONNECTION OF TWO DC-LINK CAPACITORS, METHOD FOR CONTROLLING THE BALANCER CIRCUIT AND CONVERTER ARRANGEMENT

(71) Applicant: Huawei Technologies Co., Ltd., Shenzhen (CN)

(72) Inventors: Sebastian Rosado, Nuremberg (DE); Piniwan Thiwanka Bandara Wijekoon, Nuremberg (DE); Zhaohui Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 175 days.

(21) Appl. No.: 18/741,105

(22) Filed: Jun. 12, 2024

(65) Prior Publication Data

US 2024/0333124 A1 Oct. 3, 2024

Related U.S. Application Data

(63) Continuation of application No. PCT/EP2021/085605, filed on Dec. 14, 2021.

(51) Int. Cl.

| | |
|---|---|
| ***H02M 1/15*** | (2006.01) |
| ***H02M 3/07*** | (2006.01) |
| ***H02M 7/483*** | (2007.01) |

(52) U.S. Cl.
CPC ............... *H02M 3/07* (2013.01); *H02M 1/15* (2013.01); *H02M 7/483* (2013.01)

(58) Field of Classification Search
CPC . H02M 1/15; H02M 3/07–078; H02M 7/4833
See application file for complete search history.

(56) References Cited

U.S. PATENT DOCUMENTS

| | | | |
|---|---|---|---|
| 10,516,365 | B1 | 12/2019 | Serban et al. |
| 2011/0116293 | A1 | 5/2011 | Tabata et al. |

(Continued)

FOREIGN PATENT DOCUMENTS

| | | | |
|---|---|---|---|
| CN | 104253554 | A | 12/2014 |
| CN | 104901303 | A | 9/2015 |

(Continued)

OTHER PUBLICATIONS

Ertl, Hans, Thomas Wiesinger, and Johann W. Kolar. "Active voltage balancing of DC-link electrolytic capacitors." IET power Electronics 1.4 (2008): 488-496. (Year: 2008).*

(Continued)

*Primary Examiner* — Peter M Novak
(74) *Attorney, Agent, or Firm* — Conley Rose, P.C.

(57) ABSTRACT

A balancer circuit for a series connection of two direct current (DC)-link capacitors comprises a first and second terminal for being connected to a first and second terminal of the series connection of the capacitors, respectively; and a third terminal for being connected to a node between the capacitors. The balancer circuit comprises a first and second inductor and a capacitor arrangement connected in series between the first and second terminal of the balancer circuit. The capacitor arrangement is connected between the first and second inductor. The balancer circuit comprises a first switch arrangement connected between the third terminal and a node between the first inductor and the capacitor arrangement; and a second switch arrangement connected between the third terminal and a node between the second inductor and the capacitor arrangement. The first and second switch arrangement each comprises a semiconductor switch or two semiconductor switches connected in series.

20 Claims, 10 Drawing Sheets

(56) References Cited

U.S. PATENT DOCUMENTS

| | | | |
|---|---|---|---|
| 2015/0131349 | A1 | 5/2015 | El-Barbari et al. |
| 2021/0152077 | A1 | 5/2021 | Strandberg et al. |
| 2021/0175742 | A1 | 6/2021 | Hayashi et al. |
| 2022/0376624 | A1 | 11/2022 | Bae et al. |

FOREIGN PATENT DOCUMENTS

| | | | |
|---|---|---|---|
| CN | 105763086 | A | 7/2016 |
| CN | 104796027 | B | 8/2017 |
| CN | 110768237 | A | 2/2020 |
| CN | 110912435 | A | 3/2020 |
| DE | 102017219674 | A1 | 5/2019 |
| EP | 1662643 | A2 | 5/2006 |
| EP | 3474442 | A2 | 4/2019 |
| WO | 2019019928 | A1 | 1/2019 |
| WO | 2020026430 | A1 | 2/2020 |
| WO | 2021010570 | A1 | 1/2021 |

OTHER PUBLICATIONS

Jakub Hachlowski, "DC-Link Voltage Balancing Converter with Resonant Switched-Capacitor Circuit for Four-Level and Six-Level NPC Inventor," Sep. 1, 2019, 10 pages.

A. von Jouanne, "A Multilevel Inverter Approach providing DC-link balancing, ride-through enhancement, and common-mode voltage elimination," IEEE Transactions on Industrial Electronics, vol. 49, No. 4, Aug. 2002, pp. 739-745.

Wang Fei et al: "Topology Deduction and Analysis of Voltage Balancers for DC Microgrid", IEEE Journal of Emerging and Selected Topics in Power Electronics, IEEE, Piscataway, NJ, USA, vol. 5, No. 2, Jun. 1, 2017, total 9 pages.

Herrera Luis et al: "Comparison and Control of Voltage Balancers for Bipolar DC Aircraft Power Systems", 2018 IEEE Energy Conversion Congress and Exposition (ECCE), IEEE, Sep. 23, 2018, total 5 pages.

Rivera Sebastian et al: "Bipolar DC Power Conversion: State-of-the-Art and Emerging Technologies", IEEE Journal of Emerging and Selected Topics in Power Electronics, IEEE, Piscataway, NJ, USA, vol. 9, No. 2, Mar. 16, 2020, total 13 pages.

Turksoy Arzu et al: "A comprehensive overview of the dc-dc converter-based battery charge balancing methods in electric vehicles", Renewable and Sustainable Energy Reviews, Elseviers Science, New York, NY, US, vol. 133, Aug. 26, 2020, total 20 pages.

Xi Lu et al: "Modularized buck-boost + Cuk converter for high voltage series connected battery cells", Applied Power Electronics Conference and Exposition (APEC), 2012 Twenty-Seventh Annual IEEE, IEEE, Feb. 5, 2012, total 7 pages.

Pan Zach et al: "Low-Loss Switched Capacitor Voltage Balancing Circuit and Its Design Considerations", 2019 IEEE Energy Conversion Congress and Exposition (ECCE), IEEE, Sep. 29, 2019, total 7 pages.

* cited by examiner

BALANCER CIRCUIT FOR SERIES CONNECTION OF TWO DC-LINK CAPACITORS, METHOD FOR CONTROLLING THE BALANCER CIRCUIT AND CONVERTER ARRANGEMENT

CROSS-REFERENCE TO RELATED APPLICATIONS

This is a continuation of International Patent Application No. PCT/EP2021/085605 filed on Dec. 14, 2021, the disclosure of which is hereby incorporated by reference in its entirety.

TECHNICAL FIELD

The disclosure relates to a balancer circuit for a series connection of two direct current (DC)-link capacitors and a method for controlling such a balancer circuit. Further, the disclosure relates to a converter arrangement comprising one or more such balancer circuits.

BACKGROUND

The disclosure is in the field of converters, such as DC-to-alternating current (AC) converters or AC-to-DC converters. In particular, the disclosure is directed to balancing the voltage across a series connection of at least two DC-link capacitors that provide DC power to or receive DC power from a DC side of a converter. For example, the series connection of the at least two DC-link capacitors may provide DC power to a DC side of a DC-to-AC converter or may receive DC power from a DC side of an AC-to-DC converter. The term "power converter" may be used as a synonym for the term "converter" and, thus, a DC-to-AC converter may be referred to as DC-to-AC power converter and an AC-to-DC converter may be referred to as AC-to-DC power converter. A DC-to-AC converter is configured to convert DC voltage or DC power to AC voltage or AC power. In other words, a DC-to-AC converter is configured to generate, based on DC voltage or DC power, an AC voltage or AC power. The term "DC-to-AC inverter" (in short "inverter") may be used as a synonym for the term "DC-to-AC converter". The term "alternating voltage" may be used as a synonym for the term "AC voltage". The term "direct voltage" may be used as a synonym for the term "DC voltage". An AC-to-DC converter is configured to convert AC voltage or AC power to DC voltage or DC power. In other words, an AC-to-DC converter is configured to generate, based on AC voltage or AC power, a DC voltage or DC power. The term "AC-to-DC rectifier" may be used as a synonym for the term "AC-to-DC converter". A DC-to-DC converter is configured to convert a first DC voltage or power to a second DC voltage or power.

SUMMARY

A converter arrangement comprising a DC-to-AC converter, such as a three-phase DC-to-AC converter, having a multi-level circuit topology (e.g. at least three input terminals) may comprise at least two DC-link capacitors for providing DC voltage to the DC-to-AC converter. For this type of DC-to-AC power converter the DC voltage provided to the DC-to-AC power converter is the sum of several DC-link voltages, i.e. the sum of the DC-link voltage across the at least two DC-link capacitors. For example, in case of a series connection of two DC-link capacitors the potential of an intermediate point or node between the two DC-link capacitors may experience some variation (e.g. periodic oscillation) that is dependent on the circuit, modulation type, and operation condition of the DC-to-AC converter. This is correspondingly valid for a respective intermediate point or node between two adjacent DC-link capacitors of a series connection of three or more DC-link capacitors. Such voltage oscillations are undesirable because they increase the stress on the DC-link capacitors and in case these voltage oscillations become large, they may introduce perturbation or disturbance on the converter operation of the DC-to-AC converter. The above may be correspondingly valid for a converter arrangement comprising an AC-to-DC converter, such as a three phase AC-to-DC converter, wherein the converter arrangement comprises at least two DC-link capacitors for receiving DC voltage from the AC-to-DC converter. The following description is with regard to a DC-to-AC converter. It may be correspondingly valid with regard to an AC-to-DC converter.

In some cases, the DC-link capacitors are configured in a split circuit. FIG. 1 shows an example of a split DC-link capacitor configuration in case of two DC-link capacitors electrically connected in series. Herein, the passage "electrically connect" may be abbreviated by the term "connect". As exemplarily shown in FIG. 1, the DC-to-AC converter 101 comprises three input terminals with which the split circuit topology of the series connection of two DC-link capacitors is electrically connected. In this configuration, each of the two DC-link capacitors are split in two capacitors, wherein the top DC-link capacitor is split into capacitors 102*a* and 102*a*' and the bottom DC-link capacitor is split into capacitors 102*b* and 102*b*'. The capacitor 102*a*' is electrically connected via a small inductance 103*a* to the capacitor 102*a* and the capacitor 102*b*' is electrically connected via a small inductance 103*b* to the capacitor 102*b*. In the example configuration of DC-link capacitors of FIG. 1, during operation of the DC-to-AC converter 101, the section of capacitors 102*a* and 102*b* that is directly connected to the DC-to-AC converter 101 is circulated mostly with high frequency current components. That is there is oscillation at the midpoint or node between the DC-link capacitors 102*a* and 102*b*. Such oscillation may be referred to as partial DC-link voltage oscillations (abbreviated as DC-link voltage oscillations). During the operation of the DC-to-AC converter 101 the capacitor section of capacitors 102*a*' and 102*b*' that is connected to the small inductances 103*a* and 103*b* will be circulated by low frequency components due to the smoothing effect of the inductances 103*a* and 103*b*. The high frequency components are originated by commutations of the DC-to-AC power converter 101 while the low frequency components relate to the partial DC-link voltage oscillations.

A simple approach to limit the DC-link voltage oscillations is to increase the capacitance of the DC-link capacitors connected to the DC-to-AC converter. However, this has a negative impact on the cost and power density of the converter. Other possible solutions to reduce the mid-point oscillation (i.e. the DC-link voltage oscillations) may be software based or hardware based. Software based approaches mostly use appropriate modulation schemes for operating the DC-to-AC converter, or modify the modulation scheme in order to reduce the DC-link voltage oscillation. Hardware based approaches use additional circuitry connected to the DC-link capacitors (in short DC-links). This additional circuitry may act as a local power converter that transfers energy among the DC-link capacitors in order to reduce, or minimize, the local voltage oscillations.

Approaches based on modifying a modulation scheme of the DC-to-AC converter (i.e. software based approaches) in order to balance the voltage among the DC-link sections and, thus, counter DC-link voltage oscillations always require to trade-off among the performance parameters of the DC-to-AC converter (e.g. power loss, harmonic distortion, common mode voltage, mid-point balance, etc.). It is not possible to achieve the best performance for all the parameters. In addition, in case a particular modulation scheme is used, the degrees of freedom may reduce and the possibility of reaching a good performance, for example in terms of mid-point balance, may become limited. This is specially the case when discontinuous pulse-width modulation (DPWM) schemes are used for the operation of the DC-to-AC converter. These types of scheme involve only a fraction of semiconductor switching losses of the DC-to-AC converter but at the same time create a large unbalance of the voltages across the DC-link capacitors (i.e. partial DC-link voltages).

Hardware based solutions are based on additional power converters electrically connected to the DC-link capacitors. The principle of operation of such additional power converters (e.g. DC-to-DC converters) is by transferring instantaneous power between the different sections of the DC-link capacitor section. This power transfer reflects in the energy stored at the DC-link capacitors, i.e. the capacitor charge, which reflects on the capacitor voltage. By properly transferring charge among the DC-link capacitor sections, it is possible to achieve only a small oscillation of the intermediate points (e.g. node between capacitors 102*a* and 102*b* of FIG. 1), i.e. reduce the DC-link voltage oscillations, and, thus, to achieve a good mid-point balance. The terms "mid-point" and "intermediate point" may be used as synonyms.

Several power converter circuits have been proposed for mid-point balance (also called neutral point balancer (NPB)), i.e. balancing the voltage across the DC-link capacitors electrically connected in series. For example, in the example of FIG. 1, there are two DC-link capacitors electrically connected in series (which each are split into two capacitors), wherein the balanced case is shown, i.e. half the DC voltage (Vdc/2) is present across the top DC-link capacitor (i.e. capacitors 102*a* and 102*a*') and across the bottom DC-link capacitor (i.e. capacitors 102*b* and 102*b*'). Although FIG. 1 exemplarily shows a split configuration, the aforementioned is correspondingly valid for DC-link capacitors without such split configuration (i.e. the capacitors 102*a*' and 102*b*' and inductances 103*a* and 103*b* are not present).

The above-mentioned converter circuits (e.g. DC-to-DC converters) may operate among two adjacent DC-link capacitors (e.g. capacitors 102*a* and 102*b*) of the series connection of DC-link capacitors. In case the DC-link (i.e. the series connection of DC-link capacitors) for a DC-to-AC power converter has more than two DC-link capacitors (not shown in FIG. 1), more balancer circuits may be used.

FIG. 2 shows three example of balancer circuits (e.g., NPBs) for DC-link capacitors. The topology of FIG. 2 (A) shows a bidirectional buck-boost circuit comprising a phase-leg and an inductor. In such balancer circuit topology, the inductor is used to store energy in the magnetic field and transfer that energy between the DC-link capacitors 102*a* and 102*b* to balance the voltage between them. The charge and discharge of the inductor is done at each switching cycle. Therefore, the balancing action is directly related to the size of the inductor. Because of that, the buck-boost circuit requires a large inductor to achieve a significant balancing effect.

An alternative to the circuit of FIG. 2 (A) may be the double buck-boost circuit shown in FIG. 2 (C). In this alternative, each of the buck-boost circuits may direct the energy in only one direction and, thus, the circuit topology of FIG. 2 (C) requires two separate inductors.

A third circuit topology of a balancer circuit is shown in FIG. 2 (B) comprising a resonant switched capacitor. The principle of operation of this circuit is to create a very low impedance path between the two DC-link capacitors 102*a* and 102*b*, such that the current may circulate freely and balance the charge on the capacitors 102*a* and 102*b* and their voltages. The current circulates as an AC current at the resonant frequency, and the circuit operates with almost no switching losses. However, the current values may become large and it is difficult to regulate the amount of voltage balance/unbalance.

Thus, the above-mentioned hardware approach using power converters for balancing a neutral point (NP) of a multilevel AC-to-DC converter and, thus, of the series connection of DC-link capacitors (exemplarily shown in FIG. 2), requires using additional hardware whose size/weight may be considerable; in addition they introduce currents and create additional losses. The terms "converter-based balancer circuit" and "power converter-based balancer circuit" may be used for referring to the hardware approach of using power converters for balancing the partial DC-link voltages of DC-link capacitors electrically connected in series.

In the light of the above, the hardware approach using power converters, e.g. any one of the circuits of FIG. 2, for balancing voltages across DC-link capacitors is disadvantageous because additional components, especially bulky passive components negatively impacting the power density of the whole system are needed. In addition, there is power loss dissipation in the power semiconductors of the power converter circuits as well as the passive components that negatively impact the overall efficiency of the converter arrangement comprising the power converter-based balancer circuit, the DC-link capacitors and the DC-to-AC converter. These losses are to be kept to a minimum such that the impact on the system level is limited. Additional current circulation due to the switching action of the DC-DC converter used for the balancing (i.e. NP balance) is present that may introduce additional current stress on the DC-link capacitors and requires using a larger amount of capacitor units. Additional perturbations or disturbances in the series connection of the DC-link capacitors is introduced by the power converter-based balancer circuit switching. These additional perturbations create a circulation of high frequency current components as well as an increased level of common mode voltage.

In view of the above, the present disclosure aims to improve a balancer circuit for a series connection of two DC-link capacitors. In particular, it may be an objective to provide a balancer circuit for a series connection of two DC-link capacitors that is improved with regard to system performance or efficiency, when the balancer circuit is used in a converter arrangement.

The objective is achieved by the subject-matter of the enclosed independent claims. Advantageous implementations are further defined in the dependent claims.

A first aspect of the disclosure provides a balancer circuit for a series connection of two DC-link capacitors. The balancer circuit comprises a first terminal for being electrically connected to a first terminal of the series connection of the two DC-link capacitors; a second terminal for being electrically connected to a second terminal of the series connection of the two DC-link capacitors; and a third terminal for being electrically connected to a node between the two DC-links capacitors. Further, the balancer circuit comprises a first inductor, a capacitor arrangement and a second inductor electrically connected in series between the first terminal and the second terminal of the balancer circuit, wherein the capacitor arrangement is electrically connected between the first inductor and the second inductor. The balancer circuit comprises a first switch arrangement electrically connected between the third terminal and a node between the first inductor and the capacitor arrangement; and a second switch arrangement electrically connected between the third terminal and a node between the second inductor and the capacitor arrangement. The first switch arrangement and the second switch arrangement each comprise a semiconductor switch or two semiconductor switches electrically connected in series.

In other words, the first aspect proposes a balancer circuit for a series connection of two DC-link capacitors that is not based on a power converter, e.g. a DC-to-DC converter, and, thus, is improved with regard to disadvantages of power converter-based balancer circuits, described above. At the same time, the balancer circuit allows transferring charge from the DC-link capacitors (when they are connected to the balancer circuit) through or via the capacitor arrangement. Such an electric charge transfer modifies the voltage at the DC-link capacitors and their stored electrical energy. The first switch arrangement and second switch arrangement allow controlling the electric charge change and, thus, voltage change of the DC-link capacitors in order to compensate oscillation generated by a converter, such as an DC-to-AC converter (when the DC-to-AC converter is connected to the DC-link capacitors, as it is exemplarily shown in FIG. 1) or an AC-to-DC converter (when the AC-to-DC converter is connected with the DC-link capacitors). Thus, the balancer circuit allows balancing the voltages across the two DC-link capacitors in order to reduce voltage oscillations while at the same time introducing minimum impact in term of circulating currents or additional power losses compared to the aforementioned power converter-based balancer circuits.

The balancer circuit of the first aspect enables transferring electrical energy (e.g. in the form of charge) in both directions, e.g. from one DC-link capacitor to the other DC-link capacitor of the two DC-link capacitor and vice versa. Thus, the balancer circuit allows balancing the voltages across the two DC-link capacitors, which may be referred to as partial DC-link voltages.

The first terminal and the second terminal of the balancer circuit may be referred to as first output terminal and second output terminal, respectively. The third terminal of the balancer circuit may be referred to as third output terminal.

The first terminal and the second terminal of the balancer circuit may be electrically connected to a first input terminal and a second input terminal of the balancer circuit, respectively. Optionally, the first terminal and the second terminal are indirectly electrically connected, e.g. via a further electrical component, to the first input terminal and the second input terminal, respectively. The first input terminal and second input terminal of the balancer circuit may be configured for being electrically connected to a DC voltage supply or may be part of a DC voltage supply. The balancer circuit may be configured to be electrically connected between the DC voltage supply and the series connection of the two DC-link capacitors so that the first input terminal of the balancer circuit is connected to a first terminal of the DC voltage supply and the second input terminal of the balancer circuit is connected to a second terminal of the DC voltage supply.

In case the voltage balancer circuit is electrically connected between the DC voltage supply and the series connection of the two DC-link capacitors, the first terminal, second terminal and third terminal of the balancer circuit are electrically connected to the series connection of the two DC-link capacitors. For example, the first terminal is connected to the first terminal of the series connection of the two DC-link capacitors, the second terminal is connected to the second terminal of the series connection of the two DC-link capacitors, and the third terminal is connected to the node between the two DC-link capacitors.

An electrical potential or voltage level at the first terminal of the DC voltage supply may be greater than an electrical potential or voltage level at the second terminal of the DC voltage supply. In other words, the first input terminal of the balancer circuit may be configured to be electrically connected to a greater electrical potential or DC voltage compared to the second input terminal of the balancer circuit. Thus, the first input terminal of the balancer circuit may be referred to as high potential input terminal or high input terminal. The second input terminal of the balancer circuit may be referred to as low potential input terminal or low input terminal. Accordingly, the first terminal of the balancer circuit may be referred to as high potential terminal or high terminal and the second terminal of the balancer circuit may be referred to as low potential terminal or low terminal.

The first inductor may be electrically connected between the first terminal of the balancer circuit and the capacitor arrangement and the second inductor may be electrically connected between the second terminal of the balancer circuit and the capacitor arrangement. Optionally, at least one of the first inductor and the second inductor may be implemented by two or more inductive sub-elements.

The node between the two DC-link capacitors may be referred to as NP, mid-point or intermediate point. Thus, the third terminal of the balancer circuit may be referred to as NP terminal or mid-point terminal. The balancer circuit may be referred to as mid-point balancer circuit or NPB circuit. The term "balancer circuit" may be abbreviated by the term "balancer".

At least one of the semiconductor switches of the balancer circuit may optionally be implemented by two or more sub-elements, for example by two or more transistors. Such transistors may be one or more metal-oxide-semiconductor field-effect transistors (MOSFETs), one or more insulated-gate bipolar transistors (IGBTs) and/or one or more bipolar-junction transistors (BJTs). The semiconductor switches of the balancer circuit may be referred to as power semiconductor switches.

In an implementation form of the first aspect, the capacitor arrangement comprises a capacitor; and the first switch arrangement and the second switch arrangement each comprise the semiconductor switch.

The capacitor arrangement may comprise or may be a capacitor. The first switch arrangement and the second semiconductor arrangement each may comprise or may be a semiconductor switch.

This allows implementing the balancer circuit with a low number of electrical components and, thus, allows achieving a low size or volume of the balancer circuit.

In an implementation form of the first aspect, the capacitor arrangement comprises two capacitors electrically connected in series; and the first switch arrangement and the second switch arrangement each comprise the two semiconductor switches.

This allows to use semiconductor switches with a lower voltage blocking rating compared to the case in which the first switch arrangement and the second switch arrangement each comprise the semiconductor switch (i.e. one semiconductor switch). Two semiconductor switches having a lower voltage blocking rating compared to a single semiconductor switch may be cheaper and of smaller size compared to the single semiconductor switch. Thus, this is advantageous with regard to costs and size of the balancer circuit depending on the costs and size of its elements or components. The two capacitors of the capacitor arrangement may be of equal capacitance and voltage rating. The term “voltage blocking capacity” may be used as a synonym for the term “voltage blocking rating”.

The capacitor arrangement may comprise or may be two capacitors electrically connected in series. The first switch arrangement and the second semiconductor arrangement each may comprise or may be the two semiconductor switches.

The two capacitors of the capacitor arrangement may be electrically connected in series between the first inductor and the second inductor. The two semiconductor switches of the first switch arrangement may be electrically connected between the third terminal and the node between the first inductor and the capacitor arrangement. The two semiconductor switches of the second switch arrangement may be electrically connected between the third terminal and the node between the second inductor and the capacitor arrangement.

In an implementation form of the first aspect, a node between the two capacitors is electrically connected via a first diode to a node between the two semiconductor switches of the first switch arrangement. The node between the two capacitors may be electrically connected via a second diode to a node between the two semiconductor switches of the second switch arrangement.

In an implementation form of the first aspect, the capacitor arrangement comprises a capacitor. The first switch arrangement and the second switch arrangement each may comprise the two semiconductor switches. A second capacitor may be electrically connected between a node between the two switches of the first switch arrangement and a node between the two semiconductor switches of the second switch arrangement.

The capacitor arrangement may comprise or may be a capacitor. The first switch arrangement and the second semiconductor arrangement each may comprise or may be the two semiconductor switches. The balancer circuit may comprise the second capacitor. The two semiconductor switches of the first switch arrangement may be electrically connected between the third terminal and the node between the first inductor and the capacitor arrangement. The two semiconductor switches of the second switch arrangement may be electrically connected between the third terminal and the node between the second inductor and the capacitor arrangement. The second capacitor may be referred to as flying capacitor.

In an implementation form of the first aspect, the first inductor and the second inductor are magnetically coupled with each other. The magnetic coupling between the first inductor and the second inductor allows higher power densities. The greater or higher the degree of coupling the greater or higher power densities may be achieved. A major effect of coupling between the first inductor and second inductor is on the size (or volume) and weight of the first inductor and second inductor. The coupling allows achieving significant weight and size (or volume) reduction of the first inductor and second inductor compared to the case of no coupling.

In an implementation form of the first aspect, the one or two semiconductor switches of each of the first switch arrangement and the second switch arrangement are one or two IGBTs, wherein a diode is electrically connected in antiparallel to each IGBT. In addition or alternatively, the one or two semiconductor switches of each of the first switch arrangement and the second switch arrangement may be one or two MOSFETS. In addition or alternatively, the one or two semiconductor switches of each of the first switch arrangement and the second switch arrangement may be one or more BJTs, wherein a diode is electrically connected in antiparallel to each BJT.

The semiconductor switches of the balancer circuit may be controllable by a control unit. The semiconductor switches of the balancer circuit may be referred to as controllable semiconductor switches. The semiconductor switches of the balancer circuit may be transistors, e.g. one or more IGBTs, one or more MOSFETs, and/or one or more BJTs. For example, the semiconductor switches of the balancer circuit may be power transistors. A diode may be electrically connected in antiparallel to each IGBT. A diode may be electrically connected in antiparallel to each BJT.

In an implementation form of the first aspect, the first switch arrangement and the second switch arrangement are controllable with a switching frequency such that

- the semiconductor switch or the two semiconductor switches of the first switch arrangement is respectively are conducting for a first time period and non-conducting for a second time period following the first time period, wherein the sum of the first time period and the second time period is equal to the inverse of the switching frequency; and
- the semiconductor switch or the two semiconductor switches of the second switch arrangement is respectively are non-conducting during the first time period and the second time period.

When the balancer circuit is electrically connected to the series connection of the two DC-link capacitors, the above allows transferring charge from a first DC-link capacitor of the two DC-link capacitors to a second DC-link capacitor of the two DC-link capacitors. The first DC-link capacitor is electrically connected to the first terminal of the series connection of the two DC-link capacitors. Thus, when the balancer circuit and the series connection of the two DC-link capacitors are electrically connected with each other, the first DC-link capacitor is electrically connected to the first terminal of the balancer circuit. The second DC-link capacitor of the two DC-link capacitors is electrically connected to the second terminal of the series connection of the two DC-link capacitors. Thus, when the balancer circuit and the series connection of the two DC-link capacitors are electrically connected with each other, the second DC-link capacitor is electrically connected to the second terminal of the balancer circuit.

The first DC-link capacitor may be referred to as upper DC-link capacitor or top DC-link capacitor and the second DC-link capacitor may be referred to as lower DC-link capacitor or bottom DC-link capacitor.

Therefore, in case an electrical charge and, thus, voltage of the first DC-link capacitor is greater than an electrical charge and, thus, voltage of the second DC-link capacitor, a balancing of the voltages across the DC-link capacitors may be achieved by transferring charge from the first DC-link capacitor to the second DC-link capacitor. The unbalancing, i.e. unequal distribution of charge, of the two DC-link capacitors may occur as a result of an operation of a DC-to-AC converter that (e.g. its input) may be electrically connected to the series connection of the two DC-link capacitors. The unbalancing, i.e. unequal distribution of charge, of the two DC-link capacitors may occur as a result of an operation of an AC-to-DC converter that (e.g. its output) may be electrically connected to the series connection of the two DC-link capacitors. In other words, the unbalancing, i.e. unequal distribution of charge, of the two DC-link capacitors may occur as a result of an operation of a converter that (e.g. its DC side) may be electrically connected to the series connection of the two DC-link capacitors.

The first switch arrangement and the second switch arrangement may be controllable by a control unit. That is, the control unit may be configured to control the first switch arrangement and the second switch arrangement. The control unit may control the first switch arrangement and the second arrangement as outlined above and as further outlined below. For this, the control unit may be configured to provide control signals to the semiconductor switches of the first switch arrangement and second switch arrangement. The control unit may be an external control unit (i.e. not part of the balancer circuit). Alternatively, the control unit may be part of the balancer circuit. That is, the balancer circuit may comprise the control unit. For example, the control unit may be a controller, a microcontroller, a processor, a microprocessor, an application-specific integrated circuit (ASIC), a field-programmable gate array (FPGA) or any combination thereof.

In an implementation form of the first aspect, the first switch arrangement and the second switch arrangement are controllable with a switching frequency such that the semiconductor switch or the two semiconductor switches of the second switch arrangement is respectively are conducting for a third time period and non-conducting for a fourth time period following the third time period, wherein the sum of the third time period and the fourth time period is equal to the inverse of the switching frequency; and the semiconductor switch or the two semiconductor switches of the first switch arrangement is respectively are non-conducting during the third time period and the fourth time period.

When the balancer circuit is electrically connected to the series connection of the two DC-link capacitors, the above allows transferring charge from the second DC-link capacitor of the two DC-link capacitors to the first DC-link capacitor of the two DC-link capacitors.

Therefore, in case a charge and, thus, voltage of the second DC-link capacitor is greater than a charge and, thus, voltage of the first DC-link capacitor, a balancing of the voltages across the DC-link capacitors may be achieved by transferring charge from the second DC-link capacitor to the first DC-link capacitor. The unbalancing, i.e. unequal distribution of charge, of the two DC-link capacitors may occur as a result of an operation of a DC-to-AC converter that (e.g. its input) may be electrically connected to the series connection of the two DC-link capacitors. The unbalancing, i.e. unequal distribution of charge, of the two DC-link capacitors may occur as a result of an operation of an AC-to-DC converter that (e.g. its output) may be electrically connected to the series connection of the two DC-link capacitors. In other words, the unbalancing, i.e. unequal distribution of charge, of the two DC-link capacitors may occur as a result of an operation of a converter that (e.g. its DC side) may be electrically connected to the series connection of the two DC-link capacitors.

The balancer circuit of the first aspect enables transferring electrical energy (e.g. in the form of charge) in both directions. Electrical charge and, thus, energy may be transferred from the first DC-link capacitor (upper DC-link capacitor) to the second DC-link capacitor (lower DC-link capacitor) and vice versa.

Optionally, the third time period may equal to the first time period and the fourth time period may equal to the second time period.

In an implementation form of the first aspect, the first switch arrangement comprises the two semiconductor switches; and the first switch arrangement is controllable to be switched from conducting to non-conducting such that a semiconductor switch, which is electrically connected to the third terminal, of the two semiconductor switches of the first switch arrangement is switched from conducting to non-conducting after the other semiconductor switch of the two semiconductor switches of the first switch arrangement is switched from conducting to non-conducting.

In an implementation form of the first aspect, the first switch arrangement comprises the two semiconductor switches; and the first switch arrangement is controllable to be switched from non-conducting to conducting such that a semiconductor switch, which is electrically connected to the third terminal, of the two semiconductor switches of the first switch arrangement is switched from non-conducting to conducting before the other semiconductor switch of the two semiconductor switches of the first switch arrangement is switched from non-conducting to conducting.

In other words, the semiconductor switch electrically connected to the third terminal and the other semiconductor switch of the first switch arrangement may be switched with a time difference (small time difference). This time difference may prevent that any of the two semiconductor switches of the first switch arrangement has to deal on its own with a total DC voltage (may be referred to as DC-link or DC-link voltage) of the series connection of the two DC-link capacitors. Thus, the aforementioned allows using semiconductor switches having a lower voltage blocking rating compared to a voltage blocking rating needed for the total DC voltage. Therefore, this may reduce costs and size of the balancer circuit.

In an implementation form of the first aspect, the second switch arrangement comprises the two semiconductor switches; and the second switch arrangement is controllable to be switched from conducting to non-conducting such that a semiconductor switch, which is electrically connected to the third terminal, of the two semiconductor switches of the second switch arrangement is switched from conducting to non-conducting before the other semiconductor switch of the two semiconductor switches of the second switch arrangement is switched from conducting to non-conducting.

In an implementation form of the first aspect, the second switch arrangement comprises the two semiconductor switches; and the second switch arrangement is controllable to be switched from non-conducting to conducting such that a semiconductor switch, which is electrically connected to the third terminal, of the two semiconductor switches of the second switch arrangement is switched from non-conducting to conducting after the other semiconductor switch of the two semiconductor switches of the second switch arrangement is switched from non-conducting to conducting.

In other words, the semiconductor switch electrically connected to the third terminal and the other semiconductor switch of the second switch arrangement may be switched with a time difference (small time difference). This time difference may prevent that any of the two semiconductor switches of the second switch arrangement has to deal on its own with the total DC voltage of the series connection of the two DC-link capacitors. Thus, the aforementioned allows using semiconductor switches having a lower voltage blocking rating compared to a voltage blocking rating needed for the total DC voltage. Therefore, this may reduce costs and size of the balancer circuit.

In an implementation form of the first aspect, the first switch arrangement and the second switch arrangement are controllable in continuous conduction mode (CCM) or in discontinuous conduction mode (DCM).

In an implementation form of the first aspect, the balancer circuit may be a balancer circuit for use in a renewable energy device, for example a photovoltaic or wind energy device. The balancer circuit may be a balancer circuit for use in an electrical driver, a power supply (e.g. an uninterruptable power supply (UPS)), charging device (e.g. an electrical vehicle (EV) charging device) etc.

In order to achieve the balancer circuit according to the first aspect of the disclosure, some or all of the implementation forms and optional features of the first aspect, as described above, may be combined with each other.

A second aspect of the disclosure provides a method for controlling a balancer circuit according to the first aspect, as described above, when the balancer circuit is electrically connected to a series connection of two DC-link capacitors. For balancing a voltage across a first DC-link capacitor of the two DC-link capacitors electrically connected to a first terminal of the series connection of the two DC-link capacitors and a voltage across a second DC-link capacitor of the two DC-link capacitors electrically connected to a second terminal of the series connection of the two DC-link capacitors, the method comprises switching the first switch arrangement or the second switch arrangement of the balancer circuit between conducting and non-conducting, while the respective other switch arrangement is non-conducting.

When the balancer circuit is electrically connected to the series connection of two DC-link capacitors, then the first terminal of the balancer circuit may be electrically connected to the first terminal of the series connection of the two DC-link capacitors, the second terminal of the balancer circuit may be connected to the second terminal of the series connection of the two DC-link capacitors, and the third terminal of the balancer circuit may be connected to the node between the two DC-link capacitors.

In an implementation form of the second aspect, for transferring electrical charge from the first DC-link capacitor to the second DC-link capacitor, the method comprises switching the first switch arrangement with a switching frequency between conducting and non-conducting such that the semiconductor switch or the two semiconductor switches of the first switch arrangement is respectively are conducting for a first time period and non-conducting for a second time period following the first time period, wherein the sum of the first time period and the second time period is equal to the inverse of the switching frequency. The semiconductor switch or the two semiconductor switches of the second switch arrangement is respectively are non-conducting during the first time period and the second time period.

In an implementation form of the second aspect, for transferring electrical charge from the second DC-link capacitor to the first DC-link capacitor, the method comprises switching the second switch arrangement with a switching frequency between conducting and non-conducting such that the semiconductor switch or the two semiconductor switches of the second switch arrangement is respectively are conducting for a third time period and non-conducting for a fourth time period following the third time period, wherein the sum of the third time period and the fourth time period is equal to the inverse of the switching frequency. The semiconductor switch or the two semiconductor switches of the first switch arrangement is respectively are non-conducting during the third time period and the fourth time period.

In an implementation form of the second aspect, the first switch arrangement comprises the two semiconductor switches. For switching the first switch arrangement from conducting to non-conducting the method may comprise switching a semiconductor switch, which is electrically connected to the third terminal, of the two semiconductor switches of the first switch arrangement from conducting to non-conducting after the other semiconductor switch of the two semiconductor switches of the first switch arrangement is switched from conducting to non-conducting. In addition or alternatively, for switching the first switch arrangement from non-conducting to conducting the method may comprise switching a semiconductor switch, which is electrically connected to the third terminal, of the two semiconductor switches of the first switch arrangement from non-conducting to conducting before the other semiconductor switch of the two semiconductor switches of the first switch arrangement is switched from non-conducting to conducting.

In an implementation form of the second aspect, the second switch arrangement comprises the two semiconductor switches. For switching the second switch arrangement from conducting to non-conducting the method may comprise switching a semiconductor switch, which is electrically connected to the third terminal, of the two semiconductor switches of the second switch arrangement from conducting to non-conducting before the other semiconductor switch of the two semiconductor switches of the second switch arrangement is switched from conducting to non-conducting. In addition or alternatively, for switching the second switch arrangement from non-conducting to conducting the method may comprise switching a semiconductor switch, which is electrically connected to the third terminal, of the two semiconductor switches of the second switch arrangement from non-conducting to conducting after the other semiconductor switch of the two semiconductor switches of the second switch arrangement is switched from non-conducting to conducting.

The above description of the balancer circuit according to the first aspect is correspondingly valid for the method of the second aspect.

The method of the second aspect and its implementation forms and optional features achieve the same advantages as the balancer circuit of the first aspect and its respective implementation forms and respective optional features.

In order to achieve the method according to the second aspect of the disclosure, some or all of the implementation forms and optional features of the second aspect, as described above, may be combined with each other.

A third aspect of the disclosure provides a converter arrangement comprising a converter, a series connection of two or more DC-link capacitors electrically connected with the converter, and one or more balancer circuits according to the first aspect, as described above, electrically connected to the series connection of the two or more DC-link capacitors.

The series connection of the two or more DC-link capacitors may be electrically connected with a DC side of the converter. For example, the converter may be a DC-to-AC converter and the series connection of the two or more DC-link capacitors may be electrically connected with the DC side of the DC-to-AC converter. The series connection of the two or more DC-link capacitors may be electrically connected with an input of the DC-to-AC converter. Optionally, the converter may be a DC-to-DC converter and the series connection of the two or more DC-link capacitors may be electrically connected to a DC side of the DC-to-DC converter. The series connection of the two or more DC-link capacitors may be electrically connected with an input or an output of the DC-to-DC converter. Optionally, the converter may be an AC-to-DC converter and the series connection of the two or more DC-link capacitors may be electrically connected to the DC side of the AC-to-DC converter. The series connection of the two or more DC-link capacitors may be electrically connected to an output of the AC-to-DC converter.

Optionally, the converter arrangement may comprise one or more different converter types. For example, the converter arrangement may comprise one or more converters (being of one or more different types), wherein a respective series connection of two or more DC-link capacitors may be electrically connected with at least one of the one or more converters, and one or more balancer circuits according to the first aspect, as described above, may be electrically connected to the respective series connection of the two or more DC-link capacitors.

In an implementation form of the third aspect, the number of DC-link capacitors is greater by one than the number of balancer circuits. To each pair of adjacent DC-link capacitors of the two or more DC-link capacitors a respective balancer circuit of the one or more balancer circuits may be electrically connected such that the third terminal of the respective balancer circuit is electrically connected to a node between the adjacent DC-link capacitors of the pair of adjacent DC-link capacitors.

The converter may be a three-phase converter. For example, the converter may be a three-phase DC-to-AC converter or a three-phase AC-to-DC converter. The converter (e.g. DC-to-AC-converter or AC-to-DC converter) may have a multi-level circuit topology. In other words, the converter may comprise three or more input terminals and/or three or more output terminals. The converter arrangement may be a renewable energy device, for example a photovoltaic or wind energy device. Optionally, the converter arrangement may be part of a renewable energy device, for example a photovoltaic or wind energy device. The converter arrangement may be an electrical driver, a power supply (e.g. a UPS), charging device (e.g. an EV charging device) etc. Optionally, the converter arrangement may be part of an electrical driver, a power supply (e.g. a UPS), charging device (e.g. an EV charging device) etc.

The converter arrangement may comprise a control unit for controlling switching of the one or more balancer circuits. The control unit may be configured or implemented as the control unit described above with regard to the balancer circuit of the first aspect.

The control unit may be configured to perform the method of the second aspect as described above. For example, the control unit may be configured to perform the method of the second aspect for controlling each of the one or more balancer circuits.

The description of the balancer circuit of the first aspect is correspondingly valid for the converter arrangement of the third aspect.

The converter arrangement of the third aspect and its implementation forms and optional features achieve the same advantages as the balancer circuit of the first aspect and its respective implementation forms and respective optional features.

In order to achieve the converter arrangement according to the third aspect of the disclosure, some or all of the implementation forms and optional features of the third aspect, as described above, may be combined with each other.

A fourth aspect of the disclosure provides a computer program comprising program code for performing when implemented on a processor, a method according to the second aspect or any of its implementation forms.

A fifth aspect of the disclosure provides a computer program comprising a program code for performing the method according to the second aspect or any of its implementation forms.

A sixth aspect of the disclosure provides a computer comprising a memory and a processor, which are configured to store and execute program code to perform the method according to the second aspect or any of its implementation forms.

A seventh aspect of the disclosure provides a non-transitory storage medium storing executable program code which, when executed by a processor, causes the method according to the second aspect or any of its implementation forms to be performed.

An eighth aspect of the disclosure provides a computer readable storage medium storing executable program code which, when executed by a processor, causes the method according to the second aspect or any of its implementation forms to be performed.

The computer program of the fourth aspect, the computer program of the fifth aspect, the computer of the sixth aspect, the non-transitory storage medium of the seventh aspect and the computer readable storage medium of the eighth aspect each achieve the same advantages as the controller of the first aspect and its respective implementation forms and respective optional features.

It has to be noted that all devices, elements, units and means described in the present application could be implemented in software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms of the present disclosure will be explained in the following description of specific embodiments in relation to the enclosed drawings.

In the figures, corresponding elements are labeled with the same reference sign.

DETAILED DESCRIPTION OF EMBODIMENTS

Figure 3:
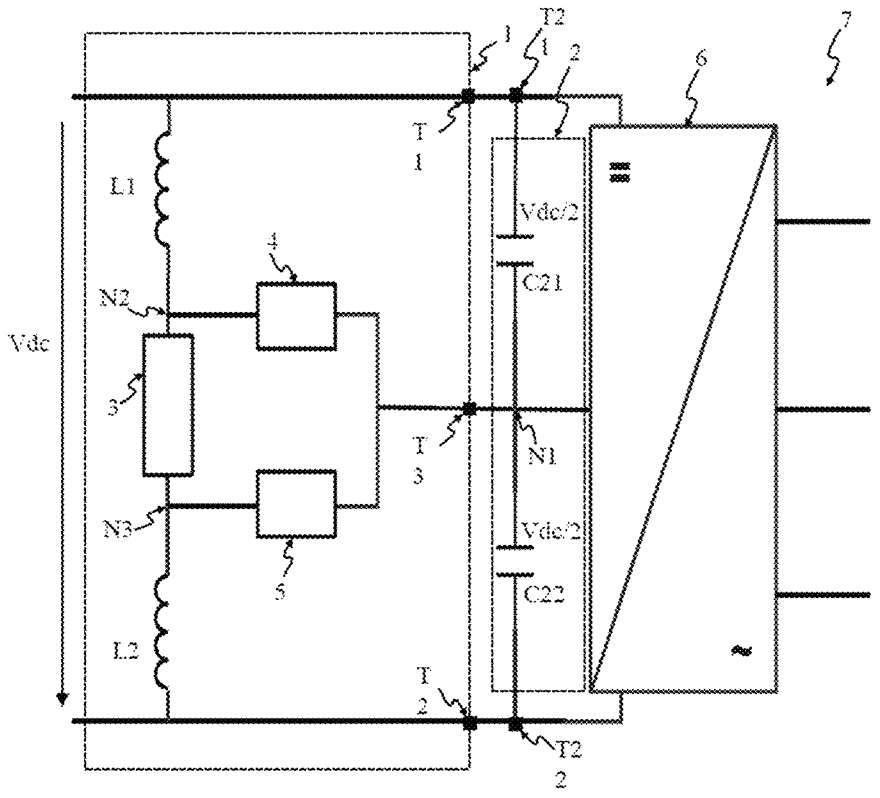
FIG. 3 shows an example of a balancer circuit according to an embodiment of the present disclosure that is part of an example of a converter arrangement according to an embodiment of the present disclosure.

FIG. 3 shows an example of a balancer circuit according to an embodiment of the present disclosure that is part of an example of a converter arrangement according to an embodiment of the present disclosure. The balancer circuit 1 of FIG. 3 is an example of the balancer circuit according to the first aspect of the present disclosure. Therefore, the description with regard to the balancer circuit of the first aspect is correspondingly valid for the balancer circuit 1 of FIG. 3.

As shown in FIG. 3, the balancer circuit 1 is a balancer circuit for a series connection 2 of two DC-link capacitors C21 and C22. In FIG. 3 a fully balanced state is exemplarily shown, i.e. the voltage across a first DC-link capacitor C21 (top capacitor) and the voltage across a second DC-link capacitor C22 (bottom capacitor) equal to half the DC-link voltage Vdc. In other words, the partial DC-link voltages of the series connection 2 of the two DC-link capacitors C21 and C22 are equal to each other.

The balancer circuit 1 comprises a first terminal T1 for being electrically connected to a first terminal T21 of the series connection 2 of the two DC-link capacitors C21 and C22; a second terminal T2 for being electrically connected to a second terminal T22 of the series connection 2 of the two DC-link capacitors C21 and C22; and a third terminal T3 for being electrically connected to a node N1 between the two DC-links capacitors C21 and C22. The node N1 may be referred to as midpoint, intermediate point or NP. Further, the balancer circuit 1 comprises a first inductor L1, a capacitor arrangement 3 and a second inductor L2 electrically connected in series between the first terminal T1 and the second terminal T2 of the balancer circuit 1, wherein the capacitor arrangement 3 is electrically connected between the first inductor L1 and the second inductor L2. The balancer circuit 1 comprises a first switch arrangement 4 electrically connected between the third terminal T3 and a node N2 between the first inductor L1 and the capacitor arrangement 3; and a second switch arrangement 5 electrically connected between the third terminal T3 and a node N3 between the second inductor L2 and the capacitor arrangement 3. The first switch arrangement 4 and the second switch arrangement 5 each comprise a semiconductor switch or two semiconductor switches electrically connected in series (not shown in FIG. 3).

The balancer circuit 1 is configured to operate so that it transfers electrical charge between the two DC-link capacitors C21 and C22, i.e. from one of them to the other, through the capacitor arrangement 3. This electrical charge transfer modifies the voltages at the DC-link capacitors C21 and C22 and their stored electrical energy. Thus, the balancer circuit 1 is configured to operate so that the charge transfer between the two DC-link capacitors C21 and C22 and, thus, change of the DC voltages across these DC-link capacitors compensates a voltage oscillation that may occur at the node N1 between the two DC-link capacitors C21 and C22. This voltage oscillation may be created by operation of the DC-to-AC converter 6 that may be electrically connected to the series connection of the two DC-link capacitors C21 and C22, as shown in FIG. 3.

In a three-phase system (i.e. the DC-to-AC converter being a three-phase converter) the voltage oscillation of the DC-link mid-point (i.e. at the node N1 between the two DC-link capacitors) occurs at three times the line frequency of the DC-to-AC converter 6 (e.g. 150 hertz (Hz) for a 50 Hz DC-to-AC converter). The type of modulation used by the DC-to-AC converter 6 impacts the magnitude of the mid-point oscillation. In case when DPWM is used the oscillations may become of considerable magnitude.

For improving the balancing benefit that may be achieved by the balancer circuit 1 the direction of the power/energy conversion by the balancer circuit may be controlled based on the control action of the DC-to-AC converter 6 (e.g. based on the control action of a modulator for controlling the DC-to-AC converter 6). Based on that, the direction of energy flowing through the balancer circuit 1 may be set such that the energy flows from the lower DC-link capacitor C22 to the upper DC-link capacitor C21, when the operation of the DC-to-AC converter 6 creates a DC-link unbalance with the upper DC-link voltage across the upper DC-link capacitor C21 (first DC-link capacitor) dropping or decreasing and the lower DC-link voltage across the lower DC-link capacitor C22 (second DC-link capacitor) raising or increasing. In cases where the lower DC-link voltage is dropping or decreasing and the upper DC-link voltage is rising or increasing due to the DC-to-AC converter's operation, the balancer circuit 1 is configured to direct the energy from the upper DC-link capacitor C21 to the lower DC-link capacitor C22 in order to compensate the unbalance. The operation of the DC-to-AC converter 6 may be controlled using DPWM. The DC-to-AC converter 6 may be operated with a power factor around unity.

In case the output voltage of the DC-to-AC converter 6 is clamped to the first terminal T21 of the series connection 2 of the two DC-link capacitors C21 and C22 (e.g. a positive DC potential), the upper DC-link voltage across the upper DC-link capacitor C21 may rapidly drop. Thus, the balancer circuit 1 may be configured to operate against this by directing the energy from the lower DC-link capacitor C22 to the upper DC-link capacitor C21. The opposite may occur during the time period where the output voltage of the DC-to-AC converter 6 is clamped to the second terminal T22 of the series connection 2 of the two DC-link capacitors C21 and C22 (e.g. a negative DC potential).

Examples of implementation forms of the balancer circuit 1 of FIG. 3 are described below with regard to FIGS. 4A and 4B, 8 and 9.

As shown in FIG. 3 the balancer circuit 1 may be part of a converter arrangement 7. The converter arrangement 7 is an example of the converter arrangement according to the third aspect of the present disclosure. Therefore, the description with regard to the converter arrangement according to the third aspect is correspondingly valid for the converter arrangement 7 of FIG. 3.

As shown in FIG. 3, the converter arrangement 7 may comprise a DC-to-AC converter 6, the series connection 2 of the two DC-link capacitors C21 and C22 may be electrically connected with an input of the DC-to-AC converter 6, and the balancer circuit 1 may be electrically connected to the series connection 2 of the two DC-link capacitors C21 and C22. According to another example (not shown in FIG. 3), the converter arrangement 7 may comprise an AC-to-DC converter, wherein the series connection 2 of the two DC-link capacitors C21 and C22 may be electrically connected with an output of the AC-to-DC converter, and the balancer circuit 1 may be electrically connected to the series connection 2 of the two DC-link capacitors C21 and C22. In other words, the present disclosure is not limited to a DC-to-AC converter 6, as shown in FIG. 3. For example, the converter of the converter arrangement 7 may be an AC-to-DC converter (not shown in FIG. 3). The description with regard to the example of the converter being a DC-to-AC converter may be correspondingly valid with respect to the converter being another converter type, such as an AC-to-DC converter. The converter arrangement 7 may comprise one or more different converter types.

The number of the two DC-link capacitors C21 and C22 being two, as shown in FIG. 3, is only by way of example and not limiting the present disclosure. Thus, the converter arrangement 7 may comprise a series connection 2 of two or more DC-link capacitors electrically connected with an input of the DC-to-AC converter 6, and one or more balancer circuits 1 electrically connected to the series connection of the two or more DC-link capacitors. Each of the one or more balancer circuits 1 is as described above with regard to the balancer circuit 1 shown in FIG. 3. That is, the number of balancer circuit 1 being one, as shown in FIG. 3, is only by way of example and not limiting the present disclosure.

With regard to the converter arrangement 7, the number of DC-link capacitors may be greater by one than the number of balancer circuits 1. To each pair of adjacent DC-link capacitors of the two or more DC-link capacitors a respective balancer circuit of the one or more balancer circuits 1 may be electrically connected such that the third terminal of the respective balancer circuit is electrically connected to a node between the adjacent DC-link capacitors of the pair of adjacent DC-link capacitors. The two DC-link capacitors C21 and C22 shown in FIG. 3 are an example of a pair of adjacent DC-link capacitors. The description above and below with regard to the balancer circuit 1 and the two DC-link capacitors C21 and C22 is correspondingly valid for each pair of adjacent DC-link capacitors and the respective balancer circuit.

The first switch arrangement 4 and the second switch arrangement 5 may be controlled by a control unit (not shown in FIG. 3). The control unit may be an external control unit (i.e. not part of the balancer circuit). Alternatively, the control unit may be part of the balancer circuit 1. That is, the balancer circuit 1 may comprise the control unit. Optionally, the DC-to-AC arrangement 7 or a device comprising the DC-to-AC arrangement 7 may comprise the control unit. For example, the control unit may be a controller, microcontroller, processor, microprocessor, ASIC, a FPGA or any combination thereof. The control unit may be configured to control the first switch arrangement 4 and the second switch arrangement 5 and, thus, control the balancer circuit 1 as outlined above and below. That is, the control unit is configured to perform the control methods or control processes described with regard to FIGS. 3 to 10. The control unit may be configured to perform the method according to the second aspect, as described above.

The balancer circuit 1 may be used or applied to any DC-to-AC converter, e.g. the DC-to-AC converter 6, and other multilevel converters that may suffer voltage unbalance at their multiple DC-links, e.g. DC-to-DC converters or AC-to-DC converters.

For further information on the balancer circuit 1 and the converter arrangement 7 of FIG. 3 reference is made to the description with regard to the balancer circuit according to the first aspect of the present disclosure and the converter arrangement according to the third aspect of the present disclosure.

Figure 4A:
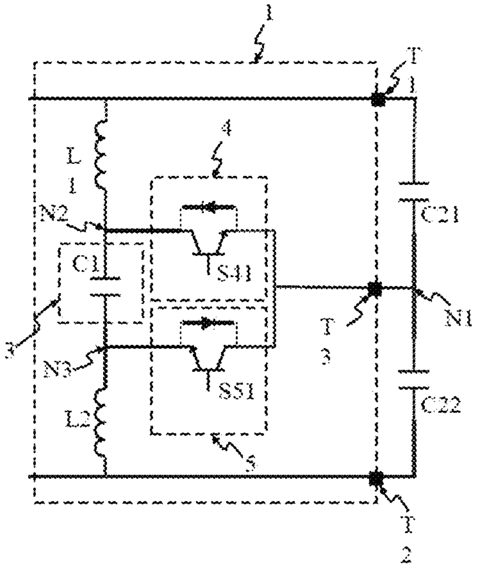
FIGS. 4A and 4B each shows an example of a balancer circuit according to an embodiment of the present disclosure.
Figure 4B:
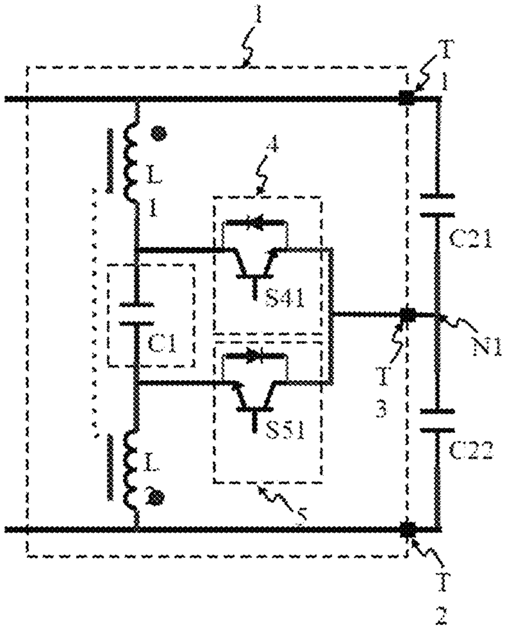

FIGS. 4A and 4B each show an example of a balancer circuit according to an embodiment of the present disclosure. The balancer circuit 1 of FIG. 4A and the balancer circuit 1 of FIG. 4B are each examples of implementation forms of the balancer circuit 1 of FIG. 3. Therefore, the description with regard to FIG. 3 is correspondingly valid for the balancer circuits 1 of FIGS. 4A and 4B.

According to the example of FIG. 4A, the capacitor arrangement 3 comprise a capacitor C1; and the first switch arrangement 4 and the second switch arrangement 5 each comprise a semiconductor switch S41 respectively S51. In FIG. 4A, the semiconductor switches S41 and S51 of the balancer circuit are insulated-gate bipolar transistors (IGBTs), wherein a diode is connected in antiparallel to each IGBT. This is only by way of example and not limiting the present disclosure. In other words, one or more, optionally each, of the semiconductor switches S41 and S51 may be implemented by a different transistor type, e.g. a MOSFET or a BJT.

The balancer circuit 1 of FIG. 4B merely differs from the balancer 1 of FIG. 4A, in that according to the example of FIG. 4B, the first inductor L1 and the second inductor L2 are magnetically coupled with each other. Optionally, the first inductor L1 and the second inductor L2 may be a two-winding coupled inductor, with two inductor branches L1 and L2. The description of FIG. 4A is valid for the balancer circuit 1 of FIG. 4B.

The magnetic coupling between the first inductor L1 and the second inductor L2 of the balancer circuit 1 of FIG. 4B allows higher power densities compared to the balancer circuit 1 of FIG. 4A. The greater or higher the degree of coupling the greater or higher power densities may be achieved. A major effect of coupling between the first inductor L1 and second inductor L2 is on the size (or volume) and weight of the first inductor L1 and second inductor L2. The coupling allows achieving significant weight and size (or volume) reduction of the first inductor L1 and second inductor L2 compared to the case of no coupling.

The coupled inductors L1 and L2 may present different degrees of coupling. In electrical terms this may be represented as follows:

$$\begin{bmatrix} v_1 \\ v_2 \end{bmatrix} = \begin{bmatrix} L_{11} & L_{12} \\ L_{21} & L_{22} \end{bmatrix} \cdot \frac{di}{dt} \begin{bmatrix} i_1 \\ i_2 \end{bmatrix}, \text{ with} \tag{1}$$

$$L_{12} = L_{21} = L_m \tag{2}$$

$$L_{11-22} = L_m + L_{lk1-2} \tag{3}$$

In the above equations, $i_1$, $i_2$ and $v_1$, $v_2$ represent the currents and voltages of each inductor L1 and L2, respectively. $L_{11}$ and $L_{22}$ represent the self-inductances of the inductors L1 and L2, respectively. $L_{12}$, $L_{21}$ and $L_m$ represent the mutual inductance components. For the operation of the balancer circuit 1 it is not required that the coupling reaches high values, even no coupling is possible as it is the case in the example of FIG. 4A. The degree of coupling between the inductors L1 and L2 of the balancer circuit 1 has a relationship to the overall size required by the inductors L1 and L2, as outlined above. A higher degree of coupling between the inductor L1 and L2 is beneficial because it may enable higher power densities.

The balancer circuit 1 of FIGS. 3, 4A, and 4B are configured to transfer energy between the two DC-link capacitors C21 and C22. Moreover, the balancer circuit 1 is configured to transfer energy in both directions. That is, the balancer circuit 1 is configured to transfer energy from a first DC-link capacitor C21 of the two DC-link capacitors C21 and C22 (i.e. the upper half DC-link) to the second DC-link capacitor C22 of the two DC-link capacitors C21 and C22 (i.e. the lower half DC-link) and vice versa. The sequence of operation of the balancer circuit 1 for an energy transfer from the first DC-link capacitor C21 to the second DC-link capacitor C22 is exemplarily shown in FIGS. 5A to 5C using the balancer circuit 1 of FIG. 4B. The description, based on FIGS. 5A to 5C, of the sequence of operation of the balancer circuit 1 for an energy transfer from the first DC-link capacitor C21 to the second DC-link capacitor C22 is correspondingly valid for different implementation forms of the balancer circuit, such as the balancer circuits of FIGS. 4A, 8, and 9. Thus, FIGS. 5A to 5C show an example of switching a balancer circuit according to an embodiment of the present disclosure.

Figure 5A:
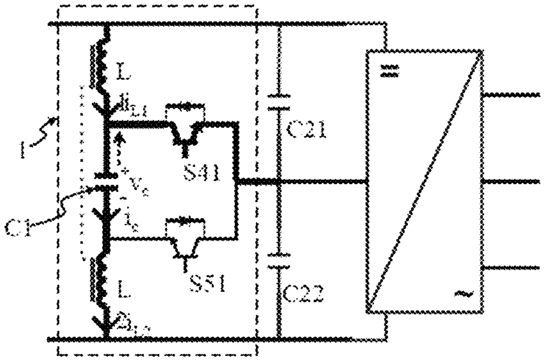
FIGS. 5A to 5C show an example of switching a balancer circuit according to an embodiment of the present disclosure.

In a first control step, shown in FIG. 5A, the first switch arrangement 4 and, thus, the semiconductor switch S41 is switched to a conducting state (i.e. turned on or switched-on) for a first time period, while the second switch arrangement 5 and, thus, the semiconductor switch S51 is non-conducting (i.e. in a non-conducting state). Thus, during the first time period the first DC-link capacitor C21 discharges through the first inductor L1 and the first switch arrangement 4 (i.e. the semiconductor switch S41) making the current $i_{L1}$ flowing through the first inductor L1 rise or increase. At the same time, the capacitor arrangement 3 and, thus, the capacitor C1 discharges through the first switch arrangement 4 (i.e. the semiconductor switch S41) and the second DC-link capacitor C22 creating a current $i_{L2}$ flowing through the second inductor L2. The current $l_{L2}$ is contrary to the reference potential (e.g. ground), i.e. negative with a rising or increasing absolute value. During the first time period, electrical charge is transferred from the capacitor arrangement 3 (i.e. the capacitor C1) to the second DC-link capacitor C22.

Figure 5B:
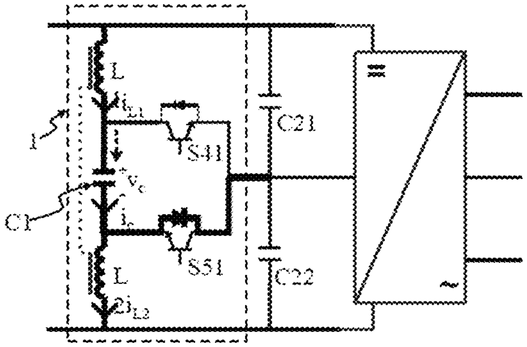

In a second control step, shown in FIG. 5B, the first switch arrangement 4 (i.e. the semiconductor switch S41) is switched to the non-conducting state (i.e. turned-off or switched off) for a second time period. As a result thereof, the current $i_{L1}$ of the first inductor L1 forces a current direction change in the capacitor arrangement 3 (i.e. the capacitor C1). The larger value of the voltage at the capacitor arrangement 3 (i.e. the capacitor C1) will make the current $i_{L1}$ of the first inductor L1 to decrease. Nevertheless, the current $i_{L1}$ of the first inductor L1 continues discharging the first DC-link capacitor C21 and transferring the charge of the first DC-link capacitor C21 to the capacitor arrangement 3 (i.e. the capacitor C1). At the same time (i.e. during the second time period) the current $i_{L2}$ flowing into the second inductor L2 and the current $i_C$ of the capacitor arrangement 3 (i.e. the capacitor C1) force the diode connected in antiparallel to the semiconductor switch S51 of the second switch arrangement 5 to go into conduction. The conduction of that diode makes the second DC-link capacitor C22 to charge, which diminishes the magnitude of the current $i_{L2}$ of the second inductor L2. Both, during the first and second control step, the first DC-link capacitor C21 discharges while the second DC-link capacitor C22 charges.

Figure 5C:
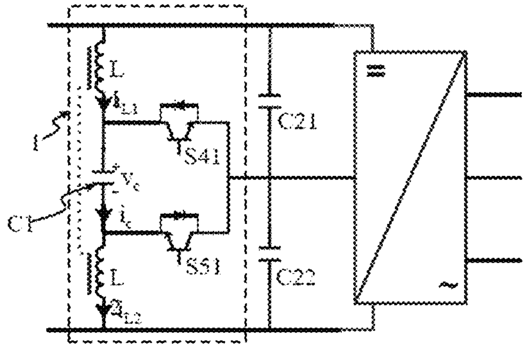

FIG. 5C indicates that during the second time the current $i_{L1}$ of the first inductor and the current $i_{L2}$ of the second inductor may reach zero amperes (A) and the diode connected in antiparallel to the switch S51 of the second switch arrangement S51 cease conducting. The charge stored in the capacitor arrangement 3 (i.e. the capacitor C1) makes its voltage terminal approximately equal to the sum of the voltages at the two DC-link capacitors C21 and C22.

The first time period, shown in FIG. 5A, and the second time period, shown in FIG. 5B and optionally FIG. 5C, may equal to the inverse of a switching frequency used for switching the first switch arrangement 4 and the second switch arrangement 5.

As described above, the first switch arrangement 4 and the second switch arrangement 5 may be controllable with a switching frequency so that the semiconductor switch S41 of the first switch arrangement 4 is conducting for a first time period and non-conducting for a second time period following the first time period (wherein the sum of the first time period and the second time period is equal to the inverse of the switching frequency), while the semiconductor switch S51 of the second switch arrangement 5 is non-conducting during the first time period and the second time period.

The balancer circuit may be operated in CCM or DCM. In case of DCM, the current $i_{L1}$ of the first inductor L1 and the current $i_{L2}$ of the second inductor L2 reach a current level of zero A, as indicated in FIG. 5C. In case of CCM the current $i_{L1}$ of the first inductor L1 and the current $i_{L2}$ of the second inductor L2 do not reach a current level of zero A and, thus, the step of FIG. 5C does not occur.

Figure 6A:
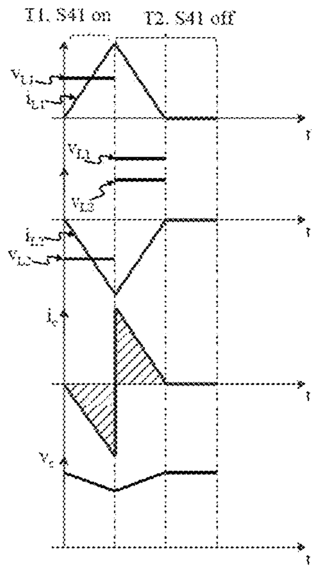
FIG. 6A shows an example of electrical parameters of a balancer circuit according to an embodiment of the present disclosure over time, when controlling the balancer circuit in DCM.
Figure 6B:
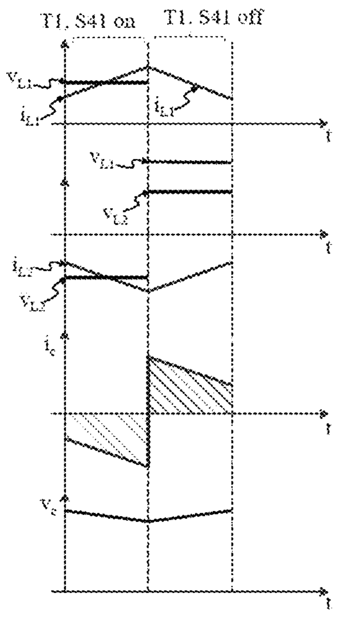
FIG. 6B shows an example of electrical parameters of a balancer circuit according to an embodiment of the present disclosure over time, when controlling the balancer circuit in CCM.

FIG. 6A shows an example of electrical parameters of a balancer circuit according to an embodiment of the present disclosure over time, when controlling the balancer circuit in DCM. In particular, FIG. 6A shows the waveforms corresponding to the operation sequence shown in FIGS. 5A to 5C for the inductor currents $i_{L1}$, $i_{L2}$ of the first inductor L1 and second inductor L2, respectively, and the voltage $v_C$ and current $i_C$ of the capacitor arrangement 3 and, thus, capacitor C1 for the DCM operation mode. FIG. 6B shows an example of electrical parameters of a balancer circuit according to an embodiment of the present disclosure over time, when controlling the balancer circuit in CCM. In particular, FIG. 6A shows the waveforms corresponding to the operation sequence shown in FIGS. 5A and 5B for the inductor currents $i_{L1}$, $i_{L2}$ of the first inductor L1 and second inductor L2, respectively, and the voltage $v_C$ and current $i_C$ of the capacitor arrangement 3 and, thus, capacitor C1 for the CCM operation mode.

In FIGS. 6A and 6B, the first time period is represented by "T1" and the second time period is represented by "T2".

Figure 7A:
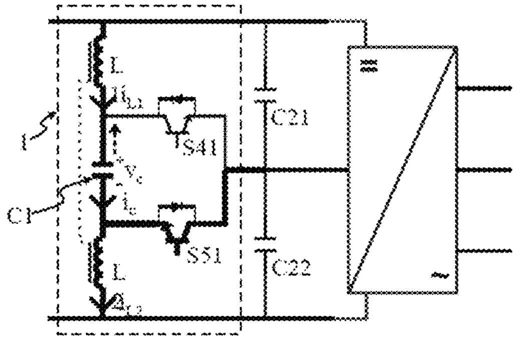
FIGS. 7A to 7C show an example of switching a balancer circuit according to an embodiment of the present disclosure.
Figure 7B:
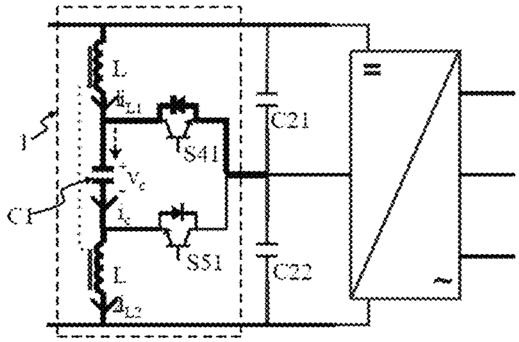
Figure 7C:
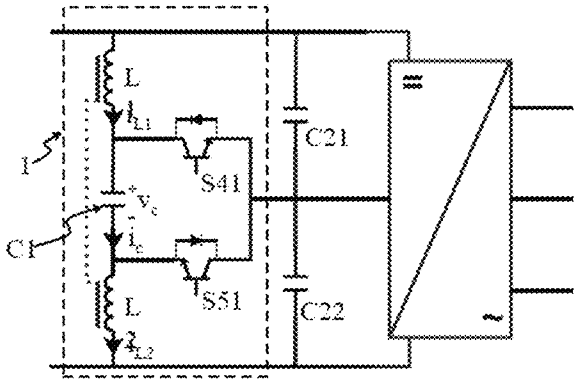

The sequence of operation of the balancer circuit 1 for an energy transfer from the second DC-link capacitor C22 to the first DC-link capacitor C21 is exemplarily shown in FIGS. 7A to 7C using the balancer circuit 1 of FIG. 4B. The description, based on FIGS. 7A to 7C, of the sequence of operation of the balancer circuit 1 for an energy transfer from the second DC-link capacitor C21 to the first DC-link capacitor C21 is correspondingly valid for different implementation forms of the balancer circuit, such as the balancer circuits of FIGS. 4A, 8 and 9. Thus, FIGS. 7A to 7C show an example of switching a balancer circuit according to an embodiment of the present disclosure.

In a first control step, shown in FIG. 7A, the second switch arrangement 5 and, thus, the semiconductor switch S51 is switched to a conducting state for a third time period, while the first switch arrangement 4 and, thus, the semiconductor switch S41 is non-conducting. In a second-control step, shown in FIG. 7B, the second switch arrangement 5 (i.e. the semiconductor switch S51) is switched to the non-conducting state for a fourth time period. During the fourth time period the diode connected in antiparallel to the semiconductor switch S41 of the first switch arrangement 4 goes into conduction. Thus, for transferring electrical charge from the second DC-link capacitor C22 to the first DC-link capacitor C21, the switch S51 of the second switch arrangement 5 and the diode connected in antiparallel to the switch S41 of the first switch arrangement 4 are the conducting devices. For this case, the operation waveforms of the electrical parameters are analogous to those shown in FIGS. 6A and 6B, but with opposite direction for the currents $i_{L1}$, $i_{L2}$, and $i_C$ of the first inductor L1, second inductor L2 and the capacitor arrangement 3 (i.e. the capacitor C1), respectively. The capacitor voltage $v_C$ will follow a similar wave shape.

The third time period and the fourth time period may be equal to the first time period and the second time period. Both, during the first control step of FIG. 7A and second control step of FIG. 7B, the second DC-link capacitor C22 discharges while the first DC-link capacitor C21 charges. The FIG. 7C shows what happens during the fourth time period in case of DCM operation. Thus, in case of CCM operation the step of FIG. 7C does not occur.

The third time period, shown in FIG. 7A, and the fourth time period, shown in FIG. 7B and optionally FIG. 7C, may equal to the inverse of a switching frequency used for switching the first switch arrangement 4 and the second switch arrangement 5.

As described above, the first switch arrangement 4 and the second switch arrangement 5 may be controllable with a switching frequency so that the semiconductor switch S51 of the second switch arrangement 5 is conducting for a third time period and non-conducting for a fourth time period following the third time period (wherein the sum of the third time period and the fourth time period is equal to the inverse of the switching frequency); while the semiconductor switch S41 of the first switch arrangement 4 is non-conducting during the third time period and the fourth time period.

The DCM operation has the advantage of no semiconductor turn-on power losses. However, for the same amount of energy transferred by the balancer circuit the current peak and root mean square (RMS) values will be larger compared to CCM operation, negatively impacting the size of the passive elements of the balancer circuit, i.e. the first inductor L1, second inductor L2 and the capacitor arrangement 3. Moreover, the turn-off power loss is larger or greater in DCM operation compared to CCM operation.

Figure 8:
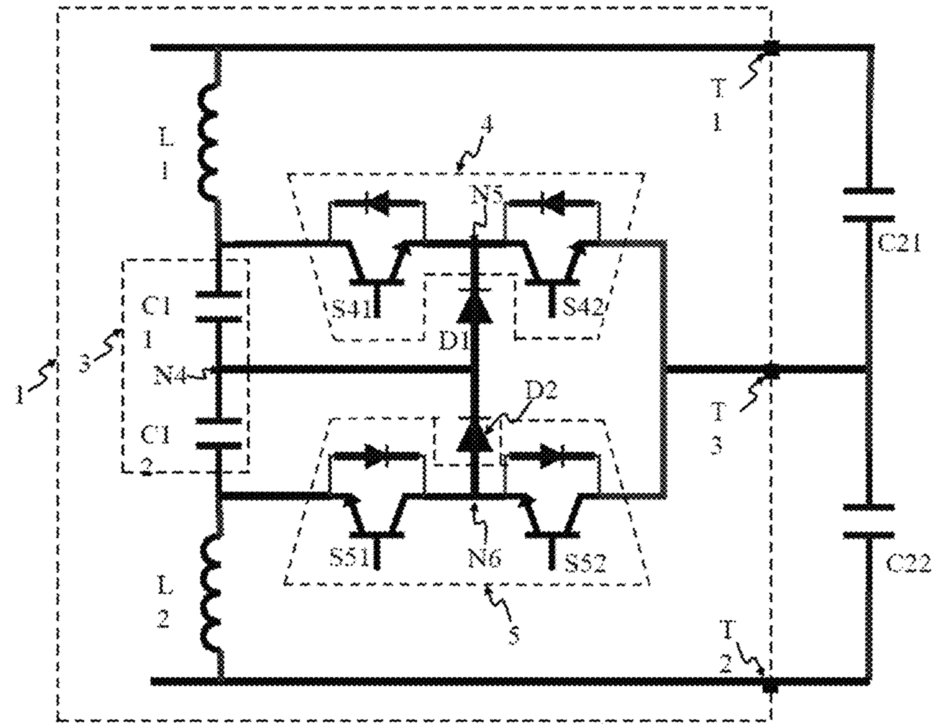
FIG. 8 shows an example of a balancer circuit according to an embodiment of the present disclosure.

FIG. 8 shows an example of a balancer circuit according to an embodiment of the present disclosure. The balancer circuit 1 of FIG. 8 is an example of an implementation form of the balancer circuit 1 of FIG. 3. Therefore, the description with regard to FIG. 3 is correspondingly valid for the balancer circuits 1 of FIG. 8.

According to the example of FIG. 8, the capacitor arrangement 3 comprises two capacitors C11 and C12 electrically connected in series. The first switch arrangement 4 and the second switch arrangement 5 each comprise two semiconductor switches S41 and S42 respectively S51 and S52 that are electrically connected in series. A node N4 between the two capacitors C11 and C12 is electrically connected via a first diode D1 to a node N5 between the two semiconductor switches S41 and S42 of the first switch arrangement 4. The node N4 between the two capacitors C11 and C12 is electrically connected via a second diode D2 to a node N6 between the two semiconductor switches S51 and S52 of the second switch arrangement 5.

The advantage of the balancer circuit of FIG. 8 compared to the balancer circuits of FIGS. 4A and 4B is that the two semiconductor switches S41 and S42 or S51 and S51 of a respective switch arrangement 4 respectively 5 may have a lower voltage blocking ($V_{bk}$) rating compared to the single semiconductor switch S41 or S51 of the respective switch arrangement 4 respectively 5 of the balancer circuits of FIGS. 4A and 4B. The two capacitors C11 and C12 connected in series of the capacitor arrangement 3 may be of equal capacitance and voltage rating.

For balancing the DC-link voltage across the DC-link capacitors C21 and C22, the two switches S41 and S42 of the first switch arrangement 4 and the two switches S51 and S52 of the second switch arrangement 5 may be controlled as described above with regard to FIGS. 5, 6 and 7 for the switch S41 of the first switch arrangement 4 and the switch S51 of the second switch arrangement 5 of the balancer circuit of FIG. 4B. When switching the switches of the first switch arrangement 4 and the second switch arrangement 5 of the balancer circuit 1 of FIG. 8, the switches S41 and S52 are operated or switched with a time difference (small time difference) or delay with respect to the switches S42 and S51. The switches S42 and S52 are each a switch that is electrically connected to the third terminal T3 of the balancer circuit 1. This time difference or delay is used for controlling the switches of the first switch arrangement 4 and the second switch arrangement 5 in order to guarantee that not a single switch of these switches, having a voltage blocking rating lower than a voltage blocking rating for the total DC-link voltage, sees or deals with the total DC link voltage and as a consequence gets damaged. The total DC-link voltage (may be referred to as full DC-link voltage) equals to the sum of the DC-link voltage across the first DC-link capacitor and the DC-link voltage across the second DC-link capacitor. In a perfectly balanced state these two DC-link voltages would equal to half the total DC-link voltage.

Therefore, the first switch arrangement 4 may be controllable to be switched from non-conducting to conducting such that the switch S41 is switched from non-conducting to conducting after the switch S42 is switched from non-conducting to conducting. Further, the first switch arrangement 4 is controllable to be switched from conducting to non-conducting such that the switch S41 is switched from conducting to non-conducting before the switch S42 is switched from conducting to non-conducting. The second switch arrangement 5 is controllable to be switched from non-conducting to conducting such that the switch S52 is switched from non-conducting to conducting after the switch S51 is switched from non-conducting to conducting. Further, the second switch arrangement 5 is controllable to be switched from conducting to non-conducting such that the switch S52 is switched from conducting to non-conducting before the switch S51 is switched from conducting to non-conducting.

The aforementioned time difference or delay, which may be of similar magnitude than the blanking time, has minimum effect on the operation of the balancer circuit 1 and, thus, the waveforms of the currents of the first inductor L1 and the second inductor L2 or the voltage of the capacitors C11 and C12. Thus, the effect of the aforementioned time difference or delay on the balancer circuit 1 is negligible.

Figure 9:
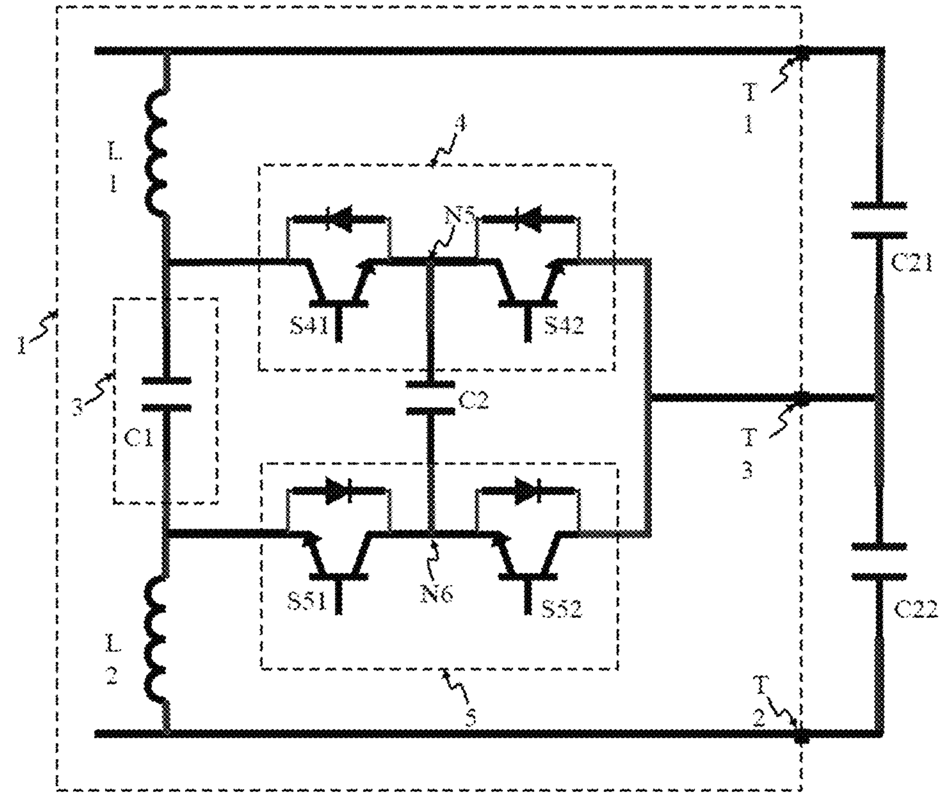
FIG. 9 shows an example of a balancer circuit according to an embodiment of the present disclosure.

FIG. 9 shows an example of a balancer circuit according to an embodiment of the present disclosure. The balancer circuit 1 of FIG. 9 is an example of an implementation form of the balancer circuit 1 of FIG. 3. Therefore, the description with regard to FIG. 3 is correspondingly valid for the balancer circuits 1 of FIG. 9.

FIG. 9 shows another example of an implementation form of the balancer circuit 1 of FIG. 3 that enables using semiconductor switches with lower voltage blocking rating. As shown in FIG. 9, the capacitor arrangement 1 comprises a capacitor C1 (first capacitor). The first switch arrangement 4 and the second switch arrangement 5 each may comprise two semiconductor switches S41 and S42 respectively S51 and S52 that are electrically connected in series. The balancer circuit 1 further comprises a second capacitor C2 that is electrically connected between a node N5 between the two switches S41 and S42 of the first switch arrangement 4 and a node N6 between the two semiconductor switches S51 and S52 of the second switch arrangement 5. During operation of the balancer circuit 1 the capacitor C1 may be charged at the sum of the DC-link voltage of the first DC-link capacitor 21 and the DC-link voltage of the second DC-link capacitor 22 or close to that sum (i.e. approximately at that sum), while the second capacitor C2 may be charged at half of the aforementioned sum of DC-link voltages or close to half the aforementioned sum of DC-link voltages (i.e. approximately at half that sum).

Optionally, the balancer circuit 1 of FIG. 9 comprising the second capacitor C2, which may be referred to as flying capacitor, may be performed according to the following two examples of operation (but not limited thereto): For example, the balancer circuit 1 of FIG. 9 may be operated as a full three-level DC-DC converter circuit. In this case, the operation may correspond to a flying capacitor phase-leg, wherein the voltage of the second capacitor C2 (flying capacitor) is controlled. According to another example, the balancer circuit 1 of FIG. 9 may be operated in a quasi-flying capacitor mode. In this case, the time of conduction of the second capacitor C2 (flying capacitor) is short, conducting only during the commutation from one semiconductor branch to the other (i.e. from one switch arrangement to the other switch arrangement), wherein the voltage of the second capacitor C2 is controlled.

Optionally, in the implementation forms of FIGS. 8 and 9, a magnetic coupling between the first inductor L1 and the second inductor L2 of the balancer circuit 1 may be implemented. In this case the above description with regard to magnetic coupling, e.g. the description with regard to FIG. 4B, is correspondingly valid.

Figure 10A:
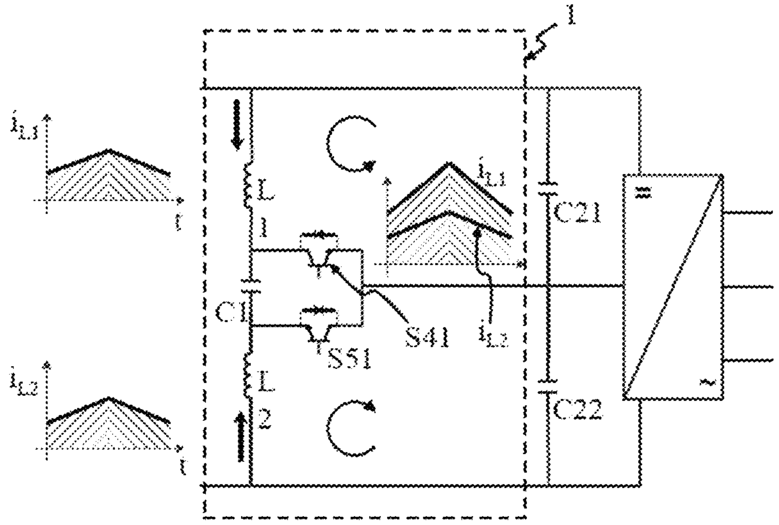
FIGS. 10A and 10B show a comparison of function between an example of a balancer circuit according to an embodiment of the present disclosure and a converter-based balancer circuit.
Figure 10B:
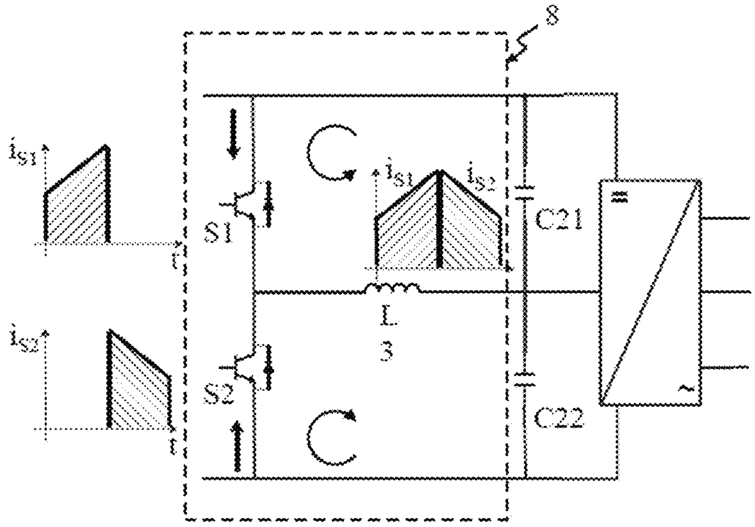

FIGS. 10A and 10B show a comparison of function between an example of a balancer circuit according to an embodiment of the present disclosure and converter-based balancer circuit.

Figure 1:
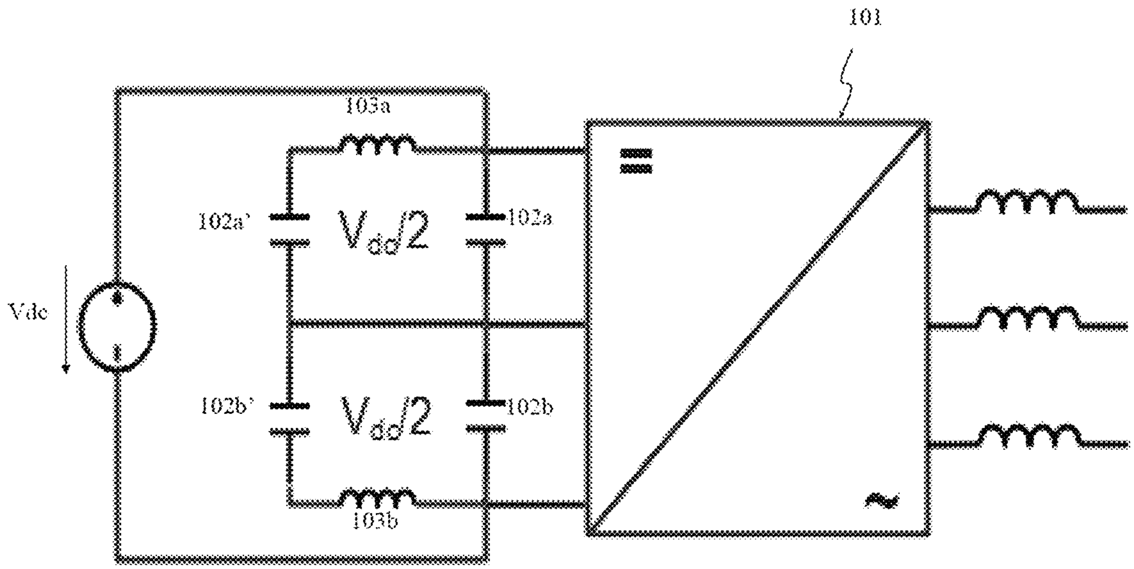
FIG. 1 shows an example of a DC-to-AC converter with a split DC-link capacitor configuration.
Figure 2A:
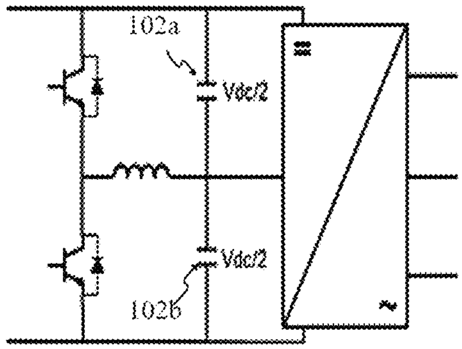
FIGS. 2A to 2C show three examples of balancer circuits for DC-link capacitors.
Figure 2B:
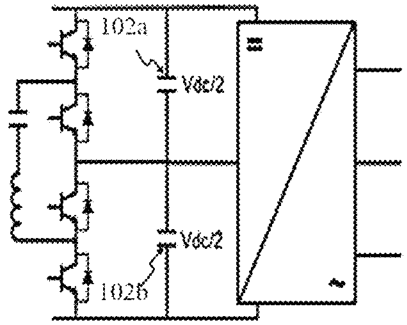
Figure 2C:
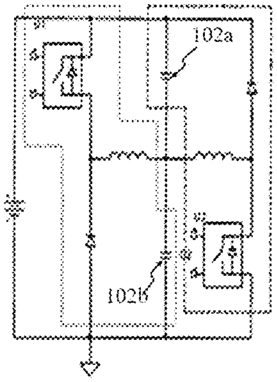

When compared to converter-based balancer circuits, as described with regard to FIG. 2, used for balancing partial DC-link voltages (i.e. voltages across DC-link capacitors electrically connected in series) the balancer circuit of the present disclosure, such as the balancer circuits of FIGS. 3 to 9, has the following advantages. The balancer circuit of the present disclosure has significantly lower passive components rating. In case magnetic coupling between the first inductor L1 and second inductor L2 is used, a considerably smaller size (volume) and weight for the sum of all magnetic components may be achieved (e.g. 30~40%). During operation, lower currents are injected into the DC-link capacitors, especially in terms of peak current. Further, there is much lower current distortion injected into the DC-link capacitors. For example, with the balancer circuit 1 of the present disclosure no current components of high di/dt circulate between the balancer circuit and the DC-link capacitors. The low distortion simplifies the control of the balancer circuit of the present disclosure and allows more freedom for selecting the control type (e.g. PWM) and switching frequency. The above advantages are compared on the basis of the same effectiveness for the NP balancing action, i.e. on the basis of the same energy transfer capacity. Schematic circuits and current waveforms for the balancer circuit of FIG. 4A, as an example of the balancer circuit of the present disclosure, and the converter-based balancer circuit of FIG. 2A may be seen in FIG. 10. That is, the balancer circuit 1 of FIG. 10A is the balancer circuit of FIG. 4A and the balancer circuit 8 of FIG. 10B is the converter-based balancer circuit of FIG. 2A.

The rating and power loss in the semiconductor switches is approximately the same for the balancer circuits of FIGS. 10A and 10B. Although, in the balancer circuit 1 of FIG. 10A two inductors L1 and L2 are used instead of one inductor L3 used in the balancer circuit 8 of FIG. 10B, the overall size and weight of the magnetics (the two inductors L1 and L2) is smaller for the balancer circuit 1 of FIG. 10A compared to the balancer circuit 8 of FIG. 10B. The smaller and smoother current injection by the balancer circuit 1 of the present disclosure, as shown in FIG. 10A, compared to the converter-based balancer circuit 8 of FIG. 10B means that impact on the inverter DC-link capacitors C21 and C22 is minimum. This avoids requiring increasing DC-link capacitor size due to higher RMS rating requirements.

The above advantages exemplarily described with regard to the balancer circuit 1 of FIG. 4A or 10A is correspondingly valid for other implementation forms of the balancer circuit of the present disclosure, e.g. the balancer circuits 1 of FIGS. 3, 4B, 8, and 9, and, thus, for the balancer circuit of the first aspect.

In addition, when compared to non-hardware based solutions, e.g. software solutions based on modifications of the modulation pattern, the balancer circuit of the present disclosure can achieve a good voltage balancing with smaller overall semiconductor power loss dissipation, enabling higher power conversion efficiency. The overall power loss dissipation in this case refers to the power losses both in the semiconductor switches of the balancer circuit and a converter (e.g. DC-to-AC converter or AC-to-DC converter) electrically connectable to the DC-link capacitors.

The present disclosure has been described in conjunction with various embodiments as examples as well as implementations. However, other variations can be understood and effected by those persons skilled in the art and practicing the claimed subject-matter, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

The invention claimed is:

1. A circuit, comprising:

a first terminal configured to be electrically connected to a second terminal of a series connection of two direct current (DC)-link capacitors;

a third terminal configured to be electrically connected to a fourth terminal of the series connection;

a fifth terminal configured to be electrically connected to a first node between the two DC-link capacitors;

a first inductor electrically connected to the first terminal;

a capacitor arrangement electrically connected to the first inductor and comprising a first capacitor;

a second inductor electrically connected to the capacitor arrangement and the third terminal, wherein the first inductor, the capacitor arrangement, and the second inductor are connected in series between the first terminal and the third terminal;

a first switch arrangement electrically connected between the fifth terminal and a second node between the first inductor and the capacitor arrangement, wherein the first switch arrangement comprises two first semiconductor switches electrically connected in series;

a second switch arrangement electrically connected between the fifth terminal and a third node between the second inductor and the capacitor arrangement, wherein the second switch arrangement comprises two second semiconductor switches electrically connected in series; and a second capacitor electrically connected between a fourth node between the two first semiconductor switches and a fifth node between the two second semiconductor switches.

2. The circuit of claim 1, wherein the first inductor and the second inductor are magnetically coupled with each other.

3. The circuit of claim 1, wherein each of the two first semiconductor switches and the two second semiconductor switches comprises one or two insulated-gate bipolar transistors (IGBTs) and a diode electrically connected in antiparallel to each of the one or two IGBTs.

4. The circuit of claim 1, wherein the first switch arrangement and the second switch arrangement are configured to be controllable with a switching frequency such that the two first semiconductor switches are conducting for a first time period and non-conducting for a second time period following the first time period, wherein a sum of the first time period and the second time period is equal to an inverse of the switching frequency, and wherein the two second semiconductor switches are non-conducting during the first time period and the second time period.

5. The circuit of claim 1, wherein the first switch arrangement and the second switch arrangement are controllable with a switching frequency such that the two second semiconductor switches are conducting for a first time period and non-conducting for a second time period following the first time period, wherein a sum of the first time period and the second time period is equal to an inverse of the switching frequency, and wherein the two first semiconductor switches are non-conducting during the first time period and the second time period.

6. The circuit of claim 1, wherein the first switch arrangement is configured to be controllable to be switched from conducting to non-conducting such that one of the two first second semiconductor switches that is electrically connected to the fifth terminal is switched from conducting to non-conducting after the other one of the two first semiconductor switches is switched from conducting to non-conducting.

7. The circuit of claim 1, wherein the first switch arrangement is configured to be controllable to be switched from non-conducting to conducting such that one of the two first second semiconductor switches that is electrically connected to the fifth terminal is switched from non-conducting to conducting before the other one of the two first semiconductor switches is switched from non-conducting to conducting.

8. The circuit of claim 1, wherein the second switch arrangement is configured to be controllable to be switched from conducting to non-conducting such that one of the two second semiconductor switches that is electrically connected to the fifth terminal is switched from conducting to non-conducting before the other one of the two second semiconductor switches is switched from conducting to non-conducting.

9. The circuit of claim 1, wherein the second switch arrangement is configured to be controllable to be switched from non-conducting to conducting such that one of the two second semiconductor switches that is electrically connected to the fifth terminal is switched from non-conducting to conducting after the other one of the two second semiconductor switches is switched from non-conducting to conducting.

10. The circuit of claim 1, wherein the first switch arrangement and the second switch arrangement are controllable in continuous conduction mode (CCM).

11. The circuit of claim 1, wherein each of the two first semiconductor switches and the two second semiconductor switches comprises one or two metal-oxide-semiconductor field-effect transistors (MOSFETs).

12. The circuit of claim 1, wherein each of the two first semiconductor switches and the two second semiconductor switches comprises one or more bipolar junction transistors (BJTs) and a diode electrically connected in antiparallel to each of the one or more BJTs.

13. The circuit of claim 1, wherein the first switch arrangement and the second switch arrangement are controllable in discontinuous conduction mode (DCM).

14. A converter arrangement, comprising:

a converter;

a series connection of two or more direct current (DC)-link capacitors electrically connected with the converter, wherein the series connection comprises:

a first terminal;

a second terminal; and a first node between the two or more DC-link capacitors;

one or more balancer circuits electrically connected to the series connection, wherein each of the one or more balancer circuits comprises:

a third terminal electrically connected to the first terminal;

a fourth terminal electrically connected to the second terminal;

a fifth terminal electrically connected to the first node;

a first inductor electrically connected to the third terminal;

a capacitor arrangement electrically connected to the first inductor and comprising a first capacitor;

a second inductor electrically connected to the capacitor arrangement and the fourth terminal, wherein the first inductor, the capacitor arrangement, and the second inductor are connected in series between the third terminal and the fourth terminal;

a first switch arrangement electrically connected between the fifth terminal and a second node between the first inductor and the capacitor arrangement, wherein the first switch arrangement comprises two first semiconductor switches electrically connected in series;

a second switch arrangement electrically connected between the fifth terminal and a third node between the second inductor and the capacitor arrangement, wherein the second switch arrangement comprises two second semiconductor switches electrically connected in series; and a second capacitor electrically connected between a fourth node between the two first semiconductor switches and a fifth node between the two second semiconductor switches.

15. The converter arrangement of claim 14, wherein for each of the one or more balancer circuits, the first inductor and the second inductor are magnetically coupled with each other.

16. The converter arrangement of claim 14, wherein for each of the one or more balancer circuits, the first switch arrangement and the second switch arrangement are configured to be controllable with a switching frequency such that the two first semiconductor switches are conducting for a first time period and non-conducting for a second time period following the first time period, wherein a sum of the first time period and the second time period is equal to an inverse of the switching frequency, and wherein the two second semiconductor switches are non-conducting during the first time period and the second time period.

17. The converter arrangement of claim 14, wherein for each of the one or more balancer circuits, the first switch arrangement and the second switch arrangement are controllable with a switching frequency such that the two second semiconductor switches are conducting for a first time period and non-conducting for a second time period following the first time period, wherein a sum of the first time period and the second time period is equal to an inverse of the switching frequency, and wherein the two first semiconductor switches are non-conducting during the first time period and the second time period.

18. The converter arrangement of claim 14, wherein for each of the one or more balancer circuits, the first switch arrangement is configured to be controllable to be switched from conducting to non-conducting such that one of the two first semiconductor switches that is electrically connected to the fifth terminal is switched from conducting to non-conducting after the other one of the two first semiconductor switches is switched from conducting to non-conducting.

19. The converter arrangement of claim 14, wherein for each of the one or more balancer circuits, the first switch arrangement is configured to be controllable to be switched from non-conducting to conducting such that one of the two first semiconductor switches that is electrically connected to the fifth terminal is switched from non-conducting to conducting before the other one of the two first semiconductor switches is switched from non-conducting to conducting.

20. The converter arrangement of claim 14, wherein for each of the one or more balancer circuits, the second switch arrangement is configured to be controllable to be switched from conducting to non-conducting such that one of the two second semiconductor switches that is electrically connected to the fifth terminal is switched from conducting to non-conducting before the other one of the two second semiconductor switches is switched from conducting to non-conducting.

* * * * *